United States Patent Office 3,312,633
Patented Apr. 4, 1967

3,312,633
URANIUM DIOXIDE-ZIRCONIUM DIOXIDE
SOL PREPARATION
Jean G. Smith, Baltimore, Md., assignor to W. R. Grace & Co., New York, N.Y., a corporation of Connecticut
No Drawing. Filed May 19, 1965, Ser. No. 457,223
15 Claims. (Cl. 252—301.1)

This invention relates to uranium dioxide-zirconium dioxide sols and is specifically directed to a process for producing stable aqueous sols which contain very reactive particles of uranium dioxide-zirconium dioxide.

In summary, a process of this invention is a method for preparing a stable uranium dioxide-zirconium dioxide aquasol comprising the steps of mixing alkaline coprecipitated, substantially electrolyte-free uranium dioxide-zirconium dioxide containing from about 1 to 80 mole percent zirconium dioxide with water and with a member selected from the group consisting of a water-soluble salt of a cation selected from the group consisting of $U^{+4}$, $(ZrO)^{+2}$, mixtures thereof, and mixtures of said water-soluble salt and an acid in an amount sufficient to bring the pH of the mixture within the range of from 4.0 to 0.5, and heating the treated aqueous uranium dioxide-zirconium dioxide suspension at a temperature within the range of from 80 to 120° C. until peptization occurs.

In summary, another process of this invention is a method for preparing a stable uranium dioxide-zirconium dioxide aquasol comprising the steps of mixing an alkaline precipitated, substantially electrolyte-free uranium dioxide precipitate with water and with a member selected from the group consisting of water-soluble salts of $(ZrO)^{+2}$ and mixtures of water-soluble salts of $(ZrO)^{+2}$ with a member selected from the group consisting of $U^{+4}$ salts, acids, and mixtures thereof in an amount sufficient to bring the pH of the mixture within the range of from 4.0 to 0.5, and heating the suspension at a temperature within the range of from 80 to 120° C. until peptization occurs.

In summary, another process of this invention is a method for preparing a stable uranium dioxide-zirconium dioxide aquasol comprising the steps of mixing an alkaline precipitated, substantially electrolyte-free zirconium dioxide precipitate with water and with a member selected from the group consisting of water-soluble salts of $U^{+4}$ and mixtures of water-soluble salts of $U^{+4}$ with a member selected from the group consisting of $(ZrO)^{+2}$ salts, acids, and mixtures thereof in an amount sufficient to bring the pH of the mixture within the range of from 4.0 to 0.5, and heating the aqueous suspension at a temperature within the range of from 80 to 120° C. until peptization occurs.

The sols produced by the process of this invention are stable and do not generally settle out of suspension even after prolonged standing. The dispersed phase consists of micelles having a size of from 3 to 10 millimicrons, which micelles are intimate mixtures of uranium and zirconium oxides. Because the sol or micelles are highly dispersed and contain both uranium dioxide and zirconium dioxide, they can be mixed with a ceramic powder such as beryllia to distribute the uranium dioxide-zirconium dioxide uniformly throughout the matrix. The resulting mixture can then be pressed, molded or otherwise shaped into the desired configuration and sintered to form a hard, rigid body. The high reactivity of the colloidal particles lowers the sintering temperature of the ceramic body and yields a product having a higher final density.

The uranium dioxide-zirconium dioxide sols are also important in microsphere preparation by the sol droplet dehydration technique wherein the sol droplets are dehydrated in a hot, immiscible solvent. The uniform distribution of the oxide components in the microspheres is highly valuable. Furthermore, the sol serves as a ready medium for introducing the particles as droplets through the injection system employed. The microspheres formed from the sols produced by the method of this invention are regular spheres with a fine-grained internal structure which sinter to a high density in hydrogen.

It is an object of this invention to provide a method for producing a stable uranium dioxide-zirconium dioxide aquasol consisting of reactive particles containing intimately associated uranium dioxide and zirconium dioxide.

The uranium dioxide-zirconium dioxide aquasol of this invention can be obtained by several alternate techniques, each employing treatment of a freshly precipitated and washed hydrous metal oxide with a metal salt or with a metal salt-acid mixture. Uranium dioxide-zirconium dioxide precipitates can be treated with solutions containing $(ZrO)^{+2}$ and/or $U^{+4}$ salts. Uranium dioxide precipitates can be treated with solutions containing $(ZrO)^{+2}$ salts, and zirconium dioxide precipitates can be treated with solutions containing $U^{+4}$ salts in the process of this invention. The precipitate is obtained by mixing a solution containing soluble salts of uranium and/or zirconium with an excess of an alkaline reagent. Strong agitation is required to insure homogenous precipitation. The uranous salts and zirconyl salts from which the aqueous solutions are made are preferably the salts of a strong monovalent acid such as uranous chloride, zirconyl chloride, zirconyl nitrate, etc. Divalent and other monovalent acids such as acetic and formic acids, for example, can be employed, but the salts of strong monovalent acids are preferred. The uranous salt can be readily obtained from uranyl solutions by such means as electrolytic reduction with hydrogen, sodium, zinc, uranium metal, hydrazine, etc. The salts in the solution can be from 1 to 80 mole percent zirconium salts. The alkaline precipitating agent can be ammonium hydroxide solution, a soluble metal hydroxide such as sodium hydroxide, an amine having a base constant, $K_b$, of greater than $1 \times 10^{-8}$ at 25° C., etc. Suitable amines include methyl amine, ethyl amine, and hydrazine, for example.

The salt solution is mixed with an excess of an alkaline precipitating agent with strong agitation, and the hydrous metal oxide precipitate is formed. The metal oxide precipitate is then separated from the solution by filtering or centrifuging, for example, and is washed to remove free electrolytes. Preferably, the hydrous metal oxide is first washed with an alkaline solution such as a dilute ammonium hydroxide solution, and is then washed with water until the pH is less than 10.5.

The washed hydrous metal oxide is then redispersed in water in an amount sufficient to provide a concentration of up to about 150 grams of hydrous metal oxide per liter of suspension. Drying of the precipitate prior to redispersion should be avoided. The redispersed precipitate is then peptized by adjusting the dispersion pH and by then heating to produce a stable sol. The reagent and amount thereof which is added to the suspension depends upon the identity of the hydrous metal oxide or oxides in the suspension and the $UO_2$ to $ZrO_2$ ratio desired in the final product. Depending upon the identity and concentration of the hydrous metal oxide in suspension, the reagent solution can contain a stable salt of $(ZrO)^{+2}$, $U^{+4}$, or mixtures thereof. These salts are acid salts, effecting a reduction in pH of the suspension and simultaneously precipitating the reagent metal cation upon the particles of the suspension as additional hydrous metal oxide. The metal salts are preferably salts of a strong, monovalent acid such as hydrochloric or nitric acid. Salts of weak monovalent acids such as acetic or formic acid can also be used but peptization produced by these weak acid salts is less complete. Salts of divalent acids such as sulfuric acid can also be used, but the product sol may contain flocculated particles.

In order to provide flexibility in the quantity of hydrous metal oxide added to the system from the reagent while insuring adequate acidification, quantities of acids can be used in the reagent in conjunction with the metal salts. The acid component of the reagent is preferably a strong, monovalent acid such as hydrochloric or nitric acid. Divalent acids such as sulfuric acid and weak monovalent acids such as acetic and formic acids can also be used, but the weak acids are less effective. The quantity of acid employed is sufficient to provide a dispersion pH within the range of from about 4.0 to 0.5 and preferably from about 3.5 to 2.5. The optimum pH of the system at this point is about 3.4 when the hydrous metal oxide in suspension is uranium dioxide down to the lower values as increasing quantities of zirconium dioxide are present. Undue lapse of time between formation of the precipitate and peptization should be avoided because peptization of aged precipitates is more difficult.

The treated hydrous metal oxide suspension is then peptized by heating it with stirring at a temperature within the range of from about 80 to 120° C. for a period sufficient to produce peptization. The time required for peptization is largely dependent upon the temperature employed, lower temperatures requiring longer periods of heating. Heating times of at least 0.25 hours at temperatures of from 80 to 120° C. under reflux are suitable. Effective peptization is obtained sooner at the higher temperatures. The suspension can be heated for 6 hours or even longer. Some increase in particle size is noticeable, however, after unduly prolonged heating. Also, no advantage is obtained by extended heating. Peptization is detected by routine techniques known in the industry. Simple settling tests can be employed, for example. Preferably, the acid treated suspension is heated for about one hour at about 100° C. under reflux. An inert gas atmosphere, such as nitrogen, is maintained above the suspension to limit oxidation. Mechanical agitating devices such as ultrasonic generators or high speed shear mixers such as a "Waring Blendor" can be used to complete peptization when chemical peptization is incomplete such as when salts of weak acids or mixtures thereof with weak acids are employed as the peptizing agent.

The product uranium dioxide-zirconium dioxide aquasols are jet black. The black sol is stable and can have a solids content ranging up to 150 grams per liter. Preferably, the solids content is greater than one gram per liter. The zirconium content of the solids can range from about 1 to 80 mole percent. However, the uranium dioxide component may contain excess oxygen. The uranium dioxide component, upon analysis, has been found to have oxygen contents ranging from 2.0 to 2.4 atoms of oxygen per atom of uranium, a uranium dioxide composition up to $UO_{2.4}$. This extra oxygen is contemplated within the meaning of the term uranium dioxide and is introduced from the reaction media, from imperfect oxygen exclusion from the system with inert gas blankets, and especially from the use of oxidizing acids such as nitric acid as the peptizing agent. A major portion of the excess oxygen is believed to be interstitial and is not detrimental in the product, being removed in later processing steps such as sintering operations, for example. Storage of the aquasol under a blanket of inert gas such as nitrogen to limit contact of the sol with oxygen is preferred, however.

The aquasol concentration can be increased to greater than 20 percent by weight of the oxide by vacuum evaporation, preferably at temperatures below about 60° C. The solids concentration in the aquasol can also be increased by centrifuging and redispersing the solids in a lesser quantity of water. Dried powders can be obtained by vacuum evaporation, for example.

The uranium dioxide-zirconium dioxide aquasol will remain stable if maintained within the pH range of about 0.5 to 4, preferably at a pH of from about 1 to 3, and if the specific conductance is maintained within the range of about 0.5 to $1 \times 10^{-3}$ mho/cm. and preferably within the range of about 0.1 to $5 \times 10^{-3}$ mho/cm. The relative kinematic viscosities of the sols range from about 1 to 5 with 1.0 to 2.0 being preferred.

The sol pH was measured with a Beckman Model G pH meter, and the specific conductance was measured with an Industrial Instruments conductivity bridge, Model RC 16 B1.

The relative kinematic viscosity, $N_k$, of our sols was determined from sol density, $d_s$, and the drain time of equal volumes of the sol $t_s$ and of water $t_w$ from an Ostwald viscometer according to the following equation.

$$N_k = \frac{t_s}{t_w}$$

This invention is further illustrated by the following specific, but non-limiting examples.

Example I

This example illustrates the preparation of a uranium dioxide-zirconium dioxide sol by peptizing hydrous uranium dioxide with a zirconyl nitrate solution. The zirconium dioxide content of the product oxides was 35.5 mole percent.

A 1040 ml. volume of a uranium chloride solution obtained by electroreduction of a uranyl chloride solution and containing 50 g. equivalent $UO_2$ per liter was precipitated by the addition with stirring of 650 ml. of a 5 N aqueous ammonia solution. The resulting precipitate was filtered, washed with a 5 N aqueous ammonia solution, and then washed with water. The washed precipitate was slurried to a volume of 605 ml. with water. Next 45 ml. of a zirconyl nitrate solution containing 28.7 g. equivalent $ZrO_2$ per liter were added to the slurry with stirring, and the system was heated to 100° C. under nitrogen and maintained at this temperature for 2 hours.

A stable black sol was recovered as product. Its pH was 1.3, and its specific conductance was $3.5 \times 10^{-2}$ mho/cm. The total oxide content of the product was about 100 g. per liter.

Example II

This example describes the preparation of a uranium dioxide-zirconium dioxide sol by peptizing hydrous uranium dioxide with a zirconyl chloride solution. The zirconium dioxide content of the product oxides was 19.6 mole percent.

A 1132 ml. volume of a uranous chloride solution obtained by electroreduction of a uranyl chloride solution and containing 100 g. equivalent $UO_2$ per liter was precipitated by the addition with stirring of 500 ml. of a 7.5 N aqueous ammonia solution. The resulting hydrous oxide was filtered, washed free of electrolytes with a 3 N aqueous ammonia solution, and then washed with water. The washed precipitate was slurried to a volume of 1200 ml. with water. The slurry was peptized by adding 64.0 ml. of a zirconyl chloride solution containing the equivalent of 200 g. $ZrO_2$ per liter to the slurry and heating the slurry at 100° C. under nitrogen for one hour.

A stable black sol was recovered. Its properties were as follows:

| | |
|---|---|
| Concentration, wt. percent total oxides | 9.40 |
| Density, g./cc. | 1.0892 |
| pH | 1.40 |
| Specific conductance, mho/cm. | $2.41 \times 10^{-2}$ |
| Relative kinematic viscosity at 25° C. | 1.27 |

Example III

This example illustrates the preparation of a uranium dioxide-zirconium dioxide sol by peptizing coprecipitated uranium dioxide-zirconium dioxide with a uranous chloride solution containing hydrochloric acid. The zirconium dioxide content of the product oxides was 48.5 mole percent.

A 940 ml. volume of a uranous chloride solution obtained by electroreduction of a uranyl chloride solution and containing 100 g. equivalent $UO_2$ per liter was mixed with 276.4 ml. of a zirconyl chloride solution containing the equivalent of 202 g. $ZrO_2$ per liter. A uranium dioxide-zirconium dioxide coprecipitate was obtained by slowly adding the mixed chloride solution to 600 ml. of a 7.5 N aqueous ammonia solution. Strong agitation was maintained throughout the addition.

The resulting uranium dioxide-zirconium dioxide coprecipitate was filtered, washed until free of electrolytes with a 3 N aqueous ammonia solution and then washed with water. The washed precipitate was then slurried with water to a volume of 1300 ml. Peptization was accomplished by adding 53 ml. of a uranous chloride solution containing the equivalent of 100 g. $UO_2$ per liter together with 5.6 ml. of a 6 N aqueous hydrochloric acid solution to the slurry, and heating the slurry under nitrogen at 100° C. for one hour. The product was a black sol which settled slowly after prolonged standing. The sediment could be easily redispersed by shaking however.

Properties of the resulting uranium dioxide-zirconium dioxide sol were as follows:

Concentration, wt. percent total oxides _____ 11.25
Density, g./cc. _____ 1.1086
pH _____ 1.22
Specific conductance mho/cm. _____ $3.33 \times 10^{-2}$
Relative kinematic viscosity at 25° C. _____ 1.28

Obviously, many modifications and variations of the invention, as hereinabove set forth, may be made without departing from the essence and scope thereof, and only such limitations should be applied as are indicated in the claims.

I claim:

1. A process for preparing a stable uranium dioxide-zirconium dioxide aquasol comprising the steps of
    (a) mixing alkaline-precipitated electrolyte-free hydrous uranium dioxide with water and with a member selected from the group consisting of water-soluble salts of $(ZrO)^{+2}$ and mixtures of water-soluble salts of $(ZrO)^{+2}$ with a member selected from the group consisting of $U^{+4}$ salts, acids, and mixtures thereof sufficient to bring the pH of the mixture within the range of from about 4.0 to 0.5, and
    (b) heating the aqueous suspension at a temperature within the range of from about 80 to 120° C. until peptization occurs.

2. The process of claim 1 wherein the salts are salts of monovalent acids.

3. The process of claim 1 wherein the acids are monovalent acids.

4. The process of claim 1 wherein the heating is continued for a period of at least 0.25 hour.

5. A process for preparing a stable uranium dioxide-zirconium dioxide aquasol comprising the steps of
    (a) mixing an aqueous solution of a uranous salt of a monovalent acid with a water-soluble alkaline reagent selected from the group consisting of ammonium hydroxide, water-soluble metal hydroxide, and amines having a base constant, $K_b$, of greater than $1 \times 10^{-8}$ at 25° C. to form a uranium dioxide precipitate,
    (b) separating the precipitate from the solution and washing it,
    (c) redispersing the washed precipitate in water to a concentration of up to about 150 g. uranium dioxide per liter of suspension and treating the dispersed phase by mixing the suspension with a member selected from the group consisting of water-soluble salts of $(ZrO)^{+2}$ and mixtures of water-soluble salts of $(ZrO)^{+2}$ with a member selected from the group consisting of $U^{+4}$ salts, acids, and mixtures thereof in an amount sufficient to bring the pH of the mixture within the range of from 4.0 to 0.5, and
    (d) heating the treated suspension at a temperature of from about 80 to 120° C. until peptization occurs.

6. A process for preparing a stable uranium dioxide-zirconium dioxide aquasol comprising the steps of
    (a) mixing alkaline-precipitated electrolyte-free zirconium dioxide with water and with a member selected from the group consisting of water-soluble salts of $U^{+4}$ and mixtures of water-soluble salts of $U^{+4}$ with a member selected from the group consisting of $(ZrO)^{+2}$ salts, acids, and mixtures thereof in an amount sufficient to bring the pH of the mixture within the range of from 4.0 to 0.5, and
    (b) heating the aqueous suspension at a temperature within the range of from 80 to 120° C. until peptization occurs.

7. The process of claim 6 wherein the salts are salts of monovalent acids.

8. The process of claim 6 wherein the acids are monovalent acids.

9. The process of claim 6 wherein the heating is continued for a period of at least 0.25 hour.

10. A process for preparing a stable uranium dioxide-zirconium dioxide aquasol comprising the steps of
    (a) mixing an aqueous solution of a zirconyl salt of a monovalent acid with a water-soluble alkaline reagent selected from the group consisting of ammonium hydroxide, water-soluble metal hydroxides, and amines having a base constant, $K_b$, of greater than $1 \times 10^{-8}$ at 25° C. to form a hydrous ammonium dioxide precipitate,
    (b) separating the precipitate from the solution and washing it,
    (c) redispersing the washed precipitate in water to a concentration of up to about 150 g. of zirconium dioxide per liter of suspension and treating the dispersed phase by mixing the suspension with a member selected from the group consisting of water-soluble salts of $U^{+4}$ and mixtures of water-soluble salts of $U^{+4}$ with a member selected from the group consisting of $(ZrO)^{+2}$ salts, acids, and mixtures thereof in an amount sufficient to bring the pH of the mixture within the range of from 4.0 to 0.5, and
    (d) heating the aqueous suspension at a temperature within the range of from 80 to 120° C. until peptization occurs.

11. A process for preparing a stable uranium dioxide-zirconium dioxide aquasol comprising the steps of
    (a) mixing alkaline coprecipitated uranium dioxide-zirconium dioxide containing from about 1 to 80 mole percent zirconium dioxide with water and with a member selected from the group consisting of a water-soluble salt of a cation selected from the group consisting of $U^{+4}$, $(ZrO)^{+2}$, mixtures thereof, and mixtures of said water-soluble salt and acids in an amount sufficient to bring the pH of the mixture within the range of 4.0 to 0.5, and
    (b) heating the treated aqueous suspension at a temperature within the range of from 80 to 120° C. until peptization occurs.

12. The process according to claim 11 wherein the salts are salts of monovalent acids.

13. The process of claim 11 wherein the acids are monovalent acids.

14. The process of claim 11 wherein the heating is continued for a period of at least 0.25 hour.

15. A process for preparing a stable uranium dioxide-zirconium dioxide sol comprising the steps of
    (a) mixing an aqueous solution containing a uranous salt and a zirconyl salt with a water-soluble alkaline reagent selected from the group consisting of ammonium hydroxide, water-soluble metal hydroxides, and amines having a base constant, $K_b$, of greater than $1 \times 10^{-8}$ at 25° C. to form a uranium dioxide-zirconium dioxide precipitate, the relative portions of the uranous salt and the zirconyl salt employed being sufficient to provide a precipitate containing from about 1 to 80 mole percent zirconium dioxide, (b) separating the precipitate from the solution and washing it, (c) redispersing the washed precipitate in water to a concentration of up to about 150 g. of uranium dioxide-zirconium dioxide per liter of suspension and treating the dispersed phase by mixing this suspension with a member selected from the group consisting of a water-soluble salt of a cation selected from the group consisting of $U^{+4}$, $(ZrO)^{+2}$, mixtures thereof, and mixtures of said water-soluble salt and an acid in an amount sufficient to bring the pH of the mixture to within the range of from 4.0 to 0.5, and (d) heating the treated uranium dioxide-zirconium dioxide suspension at a temperature from about 80 to 120° C. until peptization occurs.

References Cited by the Examiner
UNITED STATES PATENTS

| | | |
|---|---|---|
| 2,984,628 | 5/1961 | Alexander et al. |
| 3,082,103 | 3/1963 | Wainer _____ 252—301.1 |
| 3,150,100 | 9/1964 | Fitch et al. _____ 252—301.1 |
| 3,186,949 | 6/1965 | Fitch et al. _____ 252—301.1 |
| 3,238,057 | 3/1966 | Fitch et al. _____ 252—301.1 X |
| 3,265,626 | 8/1966 | Fitch et al. _____ 252—301.1 |

CARL D. QUARFORTH, Primary Examiner.

S. J. LECHERT, JR., Assistant Examiner.